United States Patent [19]

Grose et al.

[11] 4,104,294

[45] Aug. 1, 1978

[54] CRYSTALLINE SILICATES AND METHOD FOR PREPARING SAME

[75] Inventors: Robert William Grose, Mobile, Ala.; Edith Marie Flanigen, White Plains, N.Y.

[73] Assignee: Union Carbide Corporation, New York, N.Y.

[21] Appl. No.: 850,363

[22] Filed: Nov. 10, 1977

[51] Int. Cl.² .............................. C07F 7/10; C07F 5/06
[52] U.S. Cl. .................................. 260/448 C; 252/426; 252/428; 252/431 N; 260/448.8 R; 260/448.2 N
[58] Field of Search ...................... 260/448.2 N, 448 C

[56] References Cited

U.S. PATENT DOCUMENTS

| | | | |
|---|---|---|---|
| 3,239,521 | 3/1966 | Weldes | 260/448.2 N X |
| 3,239,599 | 3/1966 | Weldes | 260/448.2 N |
| 3,383,386 | 5/1968 | Weldes | 260/448.2 N X |
| 3,769,309 | 10/1973 | Weldes | 260/448.2 N |

*Primary Examiner*—Paul F. Shaver
*Attorney, Agent, or Firm*—Richard G. Miller

[57] ABSTRACT

A crystalline microporous organosilicate having the composition in terms of moles of oxides of:

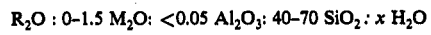

$R_2O : 0-1.5\ M_2O: <0.05\ Al_2O_3: 40-70\ SiO_2 : x\ H_2O$ wherein R represents a tetraethylammonium cation, M is an alkali metal cation and $x$ has a value of 0 to 15 depending upon the degree of hydration of the composition. The organosilicate is prepared hydrothermally using a reaction mixture comprising tetraethylammonium cations, alkali metal cations, water and a reactive source of silica. The crystalline orgnaosilicates are useful as adsorbents and, in their catalytically active form, as catalysts for organic compound formation.

2 Claims, No Drawings

CRYSTALLINE SILICATES AND METHOD FOR PREPARING SAME

The present invention relates in general to novel crystalline metal organosilicates and to the methods for their preparation.

Crystalline zeolites of the molecular sieve type are well known and are staple items of commerce. As a class of compositions, the molecular sieve zeolites are aluminosilicates which comprise a rigid three-dimensional network of $SiO_4$ and $AlO_4^-$ tetrahedra joined by the sharing of oxygen atoms such that the ratio of the total aluminum and silicon atoms to oxygen atoms is 1:2. The $AlO_4^-$ tetrahedra are ordinarily balanced electrovalently by association with a cation, which in most naturally occurring zeolites is an alkali or alkaline earth metal cation, but in synthetic zeolites or those subjected to ion exchange treatments can be essentially any metal cation, hydrogen, ammonium or alkylonium cations of appropriate atomic or molecular size. In all of these zeolitic compositions the $AlO_4^-$ tetrahedra are crystallographically significant members of the crystalline structure and apparently contribute to the acidity characteristics of the overall structure.

One such crystalline zeolitic aluminosilicate that has been synthesized from systems containing alkylonium cations is denominated "ZSM-12" and is described in detail in U.S. Pat. No. 3,832,449, issued Aug. 27, 1974 to E. J. Rosinski et al.

There has now been discovered, however, a new class of crystalline metal organosilicates which are synthesized from reaction systems essentially free of aluminum-containing reagents and which are either entirely free of framework $AlO_4^-$ tetrahedra or contain no crystallographically significant amounts thereof. These new compositions, as a class, are called TEA-silicates and have the following assynthesized composition in terms of moles of oxides:

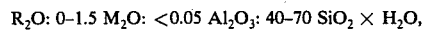

$R_2O$: 0–1.5 $M_2O$: <0.05 $Al_2O_3$: 40–70 $SiO_2$ X $H_2O$, wherein R represents the tetraethylammonium cation, M represents an alkali metal cation, and x has a value of from 0 to 15 depending upon the degree of hydration of the composition. TEA-silicates possess a definite crystal structure whose X-ray powder diffraction pattern shows the following significant lines:

TABLE I

| Interplanar Spacing d-(Å) | Relative Intensity, 100 $I/I_o$ |
|---|---|
| 11.9 ± 0.2 | S |
| 10.2 ± 0.2 | M |
| 4.76 ± 0.1 | W |
| 4.29 ± 0.08 | VS |
| 3.87 ± 0.07 | VS |
| 3.66 ± 0.07 | W |
| 3.49 ± 0.07 | W |
| 3.38 ± 0.07 | M |
| 3.20 ± 0.06 | W |
| 3.05 ± 0.05 | W |
| 2.64 ± 0.03 | W |

These values were determined by standard techniques. The radiation was the K-alpha doublet of copper, and a scintillation-counter spectrometer with a strip-chart pen recorder was used. The peak heights "I" and the positions as a function of 2 times theta, where theta is the Bragg angle, were read from the spectrometer chart. From these, the relative intensities 100 I/Io, where Io is the intensity of the strongest line or peak and d (obs.), the interplanar spacing in A corresponding to the recorded lines, were calculated. In Table I the relative intensities are given in terms of the symbols S=strong, M=medium, W=weak and VS=very strong. It should be understood that this X-ray diffraction pattern is characteristic of all the forms of TEA-silicate.

The crystalline metal organosilicates of the present invention can be suitably synthesized by preparing a reaction system which in terms of moles of oxides has a composition within the range:

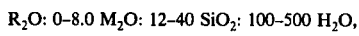

$R_2O$: 0–8.0 $M_2O$: 12–40 $SiO_2$: 100–500 $H_2O$, wherein R represents the tetraethylammonium cation and M represents an alkali metal cation, preferably sodium, potassium or lithium, said reaction mixture having a pH of greater than 12. The reaction mixture is preferably formed from the hydroxide of the alkali metal employed and the tetraethylammonium cation can be provided from an appropriate salt or base thereof such as tetraethylammonium bromide and tetraethylammonium hydroxide. Any reactive source of $SiO_2$ such as silica sols, gels, solid amorphous silicas or alkali metal silicates can be utilized in the same manner as $SiO_2$ is conventionally supplied to reaction mixtures in the preparation of synthetic zeolites. The reaction system is maintained at a temperature within the range of 125° to 150° C until crystals of TEA-silicate are formed, usually a period of from about 70 to 250 hours. Thereafter the crystals are separated from the mother liquor and recovered by filtration or other conventional means. After washing with water, the TEA-silicate crystals are dried either in vacuum or an inert atmosphere such as air at moderate temperatures, about 100°–110° C.

The crystalline organosilicates described herein are substantially free of alumina, but may contain very minor amounts thereof due to the presence of alumina as an impurity in the reactants employed, principally the silica source. Accordingly, the molar ratio of alumina to silica will be in the range of zero to less than 0.002.

Neither the tetraethylammonium nor the alkali metal cations of the silicates of this invention can be removed by ion-exchange techniques. The organic cations, however, can be decomposed thermally by calcination at temperatures of 400° C or higher in an oxidizing or inert atmosphere such as air or nitrogen, respectively. Thermal decomposition of the organic cations does not effect the essential crystalline structure of the composition and the X-ray powder diffraction pattern is essentially unaltered.

Calcination to thermally decompose the TEA cations produces an apparent pore diameter of greater than 6.2 Angstroms. As an adsorbent, it is thus capable of being used for size-selective separations of mixtures of hydrocarbon molecules, and due to its organophilic character is suitable for the selective adsorption of organic molecules from highly polar media such as water. The adsorption isotherms of TEA-silicate are of the Langmuir type and do not exhibit the hysteresis which characterizes the isotherms of amorphous silica adsorbents. In the calcined form (above 400° C) TEA-silicate adsorbs at least 2 weight-% neopentane, which has a kinetic diameter of 6.2 Angstroms. The present compositions are also suitable for catalysts in hydrocarbon conversion reactions, either alone or in conjunction with hydrogenation promoters and the like.

The present composition and the methods of making and using same are illustrated by the following examples:

EXAMPLE 1

TEA-silicate was prepared by dissolving 3.2 g of NaOH in 27.5 g of aqueous 40% $(C_2H_5)_4$NOH solution. The solution was then added with stirring to 119.9 g of silica sol (30% $SiO_2$). The synthesis molar oxide composition was:

$$(TEA)_2O \cdot 1.07\ Na_2O \cdot 16.0\ SiO_2 \cdot 150\ H_2O,$$

where TEA is tetraethylammonium. The synthesis mix was placed in a "Teflon"-lined pressure vessel and heated at about 150° C for 120 hours. The solid reaction product was recovered by filtration, washed with $H_2O$ and dried at 110° C. A portion of the product was subjected to X-ray powder diffraction analysis and found to contain the d-values listed below.

| d-Å | $100I/I_0$ |
|---|---|
| 11.9 | 60 |
| 10.2 | 26 |
| 4.98 | 5 |
| 4.77 | 18 |
| 4.29 | 100 |
| 3.88 | 84 |
| 3.66 | 16 |
| 3.49 | 24 |
| 3.39 | 32 |
| 3.21 | 10 |
| 3.06 | 8 |
| 2.89 | 5 |
| 2.65 | 5 |

Another portion of the product was subjected to chemical analysis and was found to contain: 0.82 wt.-% $Na_2O$, 6.3 wt.-% C, 1.0 wt.-% N, 84.85 wt.-% $SiO_2$ and 1075 ppm $Al_2O_3$. The product molar oxide composition was:

$$(TEA)_2O \cdot 0.40\ Na_2O \cdot 43.38\ SiO_2 \cdot 9.0\ H_2O$$

A sample of the product was calcined in air at 600° C for one hour. The calcined sample was placed was placed in a McBain-Bakr gravimetric adsorption system and activated at 350° C under vacuum for 16 hours. The activated sample adsorbed 15.2 wt.-% $O_2$ at 183° C and 750 torr, 5.8 wt.-% n-butane at 23° C and 750 torr, 8.7 wt.-% $SF_6$ at 23° C and 750 torr, 2.2 wt.-% neopentane at 23° C and 750 torr, and 7.5 wt.-% $H_2O$ at 23° C and 20 torr.

EXAMPLE 2

Another sample of TEA-silicate was prepared by dissolving 2.8 g of NaOH and 2.1 g of $(C_2H_5)_4$NBr in 10 g of $H_2O$. The solution was added with stirring to 40 g of silica sol (30% $SiO_2$). The synthesis molar oxide composition was:

$$(TEA)_2O \cdot 7.0\ Na_2O \cdot 40\ SiO_2 \cdot 429\ H_2O,$$

where TEA is tetraethylammonium. The synthesis mix was placed in a "Teflon"-lined pressure vessel and heated at about 150° C for 96 hours. The solid reaction product was recovered by filtration, washed with $H_2O$, and dried at 110° C. The product when subjected to X-ray powder diffraction analysis was found to contain the same d-values as listed hereinabove for the product of Example 1.

EXAMPLE 3

TEA-silicate was prepared by dissolving 3.6 g of NaOH and 4.2 g of $(C_2H_5)_4$ Br in 15 g of $H_2O$. The solution was added with stirring to 40 g of silica sol (30% $SiO_2$). The synthesis molar oxide composition was:

$$(TEA)_2O \cdot 4.5\ Na_2O \cdot 20\ SiO_2 \cdot 244\ H_2O,$$

where TEA is tetraethylammonium. The synthesis mix was placed in a "Teflon"-lined pressure vessel and heated at about 125° C for 240 hours. The solid reacton product was recovered by filtration, washed with $H_2O$, and dried at 110° C. The product was found to possess the characteristic X-ray powder diffraction pattern of TEA-silicate.

What is claimed is:

1. A crystalline microporous organosilicate having a composition in terms of moles of oxides of:

$$R_2O: 0-1.5\ M_2O: < 0.05\ Al_2O_3: 40-70\ SiO_2: x\ H_2O,$$

wherein R represents tetraethylammonium cation, M represents an alkali metal cation and $x$ has a value of from 0 to 15, the X-ray powder diffraction pattern of said organosilicate having at least the lines set forth in Table I.

2. Process for preparing a crystalline organosilicate of claim 1 which comprises preparing a reaction system which in terms of moles of oxides has a composition within the range $$R_2O: 0-8.0\ M_2O: 12-40\ SiO_2: 100 - 500\ H_2O,$$

wherein R represents the tetraethylammonium cation and M represents an alkali metal cation, maintaining the mixture at a temperature of from about 125° C to 150° C until crystals of the said organosilicate are formed, and separating and recovering the said crystals.

* * * * *